United States Patent [19]

Burchard et al.

[11] Patent Number: 4,721,588
[45] Date of Patent: Jan. 26, 1988

[54] CLOSED CIRCUIT PROCESS FOR THE PRODUCTION OF EXPANDED POLYSTYRENE FOAM

[75] Inventors: Edgar Burchard, Morelia; Arturo Echeverria, Mexico City; Ignacio G. Sancho, Mexico City; Otto F. Plettner, Mexico City, all of Mexico

[73] Assignee: Epsilon Holdings, N.V., Netherlands

[21] Appl. No.: 871,745

[22] Filed: Jun. 9, 1986

[51] Int. Cl.[4] .......................... B29B 17/00; C08J 9/22
[52] U.S. Cl. ........................................ 264/37; 264/53; 264/DIG. 9; 264/DIG. 15
[58] Field of Search .................... 264/37, 53, DIG. 9, 264/DIG. 15

[56] References Cited

U.S. PATENT DOCUMENTS 3,268,635  8/1966  Kraus et al. ...................... 264/55 X
4,272,469  6/1981  Smith ..................................... 264/53

Primary Examiner—Philip Anderson
Attorney, Agent, or Firm—Sughrue, Mion, Zinn, Macpeak & Seas

[57] ABSTRACT

A closed circuit process for the production of expanded polystyrene foam is described, comprising the steps of: (a) pre-expanding raw polystyrene beads containing a blowing agent in a pre-expansion vessel; (b) storing the beads in one or more closed storage containers to allow the expanded beads to return to substantially atmospheric pressure; (c) molding the expanded beads to a desired configuration in a closed mold with steam; and (d) removing the thus-formed article from the mold and placing such in an aging room, wherein at each stage the blowing agent released from the beads is recovered, separated from any residual steam by means of a condensing system, and introduced into the burner of a steam generator, thereby serving as fuel for the process.

21 Claims, 1 Drawing Figure

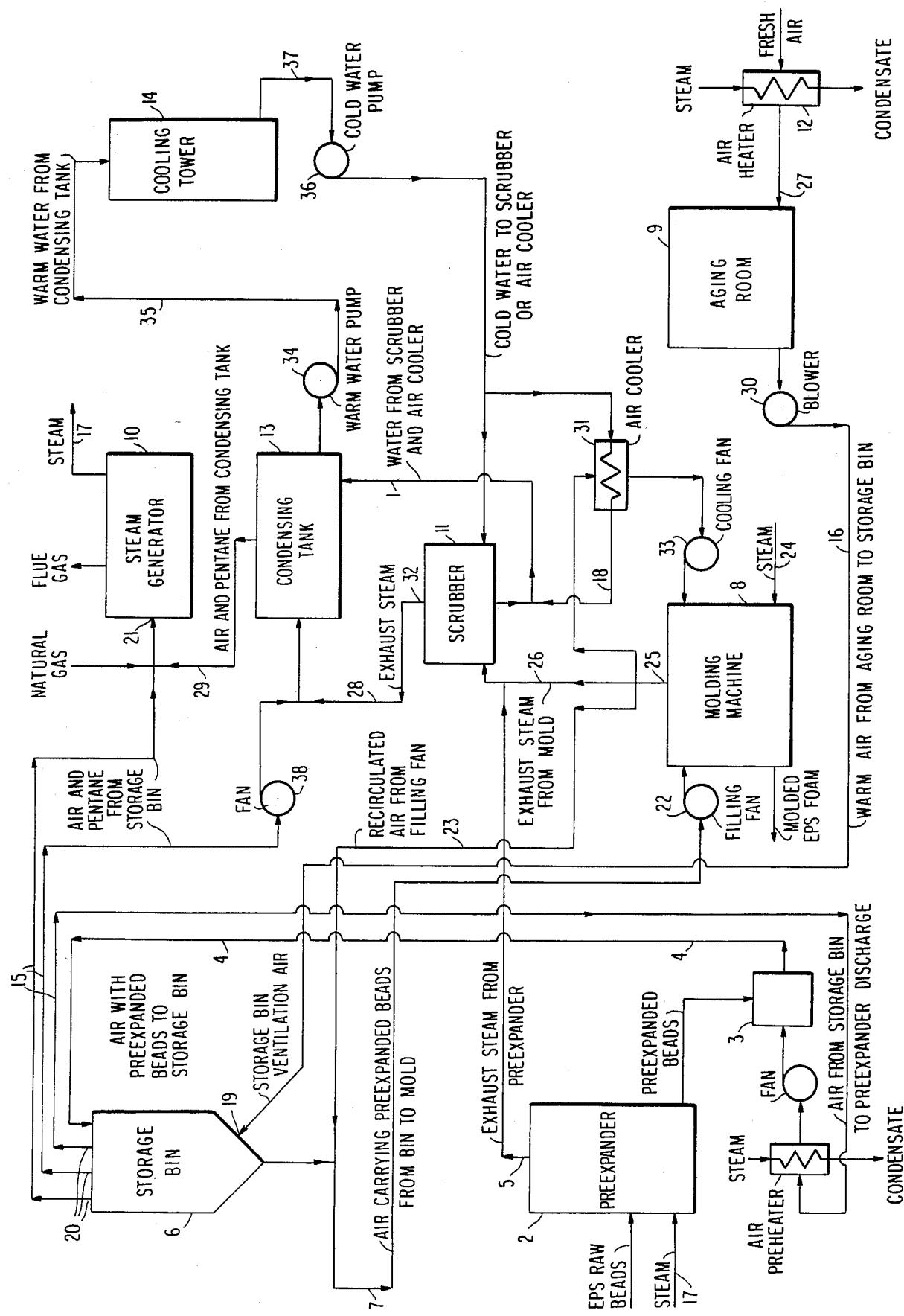

CLOSED CIRCUIT PROCESS FOR THE PRODUCTION OF EXPANDED POLYSTYRENE FOAM

FIELD OF THE INVENTION

The present invention relates to a process for the production of expanded foam articles from synthetic thermoplastic materials, particularly polystyrene foam, wherein the blowing agent is recovered and returned as fuel by means of a closed system and, thus, is not lost to the atmosphere.

BACKGROUND OF THE INVENTION

Processes for the production of expanded polystyrene foam articles are known in the art. Thermoplastic beads, e.g., polystyrene beads, containing a blowing agent, normally hydrocarbon mixtures having a boiling point between about 80° F. to 110° F., are pre-expanded in a vessel by, e.g., introducing steam into said vessel or by controlled heating. After pre-expansion, the beads may be transferred directly to a mold cavity or, alternatively, they may be placed in a storage container before molding. After the molding step, foam articles may be stored in a drying room for a certain period of time.

N-pentane, or mixtures of n- and iso-pentane (up to about 25% iso-pentane by weight), is the most widely used blowing agent contained in the expandable polystyrene beads used as the raw material in the production of expanded polystyrene foam articles. In a conventional process of pre-expansion and molding, the blowing agent becomes separated from the expanded polystyrene beads and is lost into the surrounding atmosphere. U.S. Pat. No. 4,272,469 is representative of such processes forming expanded foam articles wherein the blowing agent (n-pentane) is removed from the polystyrene beads during pre-expansion and molding and is presumably allowed to escape into the surrounding atmosphere.

Where the initial blowing agent content of the expandable polystyrene beads is about 4-8 wt %, it has been determined that approximately 1-2 wt % of the blowing agent is lost during the pre-expansion stage, approximately 1-2 wt % is lost from the pre-expanded beads in closed storage bins, approximately 1-2 wt % is lost to the atmosphere during the molding cycle, and approximately 1-2 wt % is lost during aging and/or drying of the molded foam articles.

SUMMARY OF THE INVENTION

The process of the present invention for the production of expanded polystyrene foam articles comprises a closed circuit wherein the blowing agent is not lost to the atmosphere but rather is recovered at each stage of the process, and may be used to partly fuel the steam generator used in the process or may be eliminated through combustion in an afterburner.

Thus, an object of the present invention is to provide a process for the production of expanded polystyrene foam articles wherein the blowing agent is not dispersed into the surrounding atmosphere, and, therefore, air pollution is eliminated.

A further object of the present process is to provide a more economical method for producing expanded polystyrene foam articles through the recovery of the blowing agent, e.g., n-pentane, which may be used to partly fuel the steam generator and is converted through complete combustion into carbon dioxide and water vapor, thereby contributing significantly to energy cost savings.

BRIEF DESCRIPTION OF THE DRAWINGS

The drawing is a process flow diagram illustrating one embodiment of the present process for producing expanded polystyrene foam articles with the recovery of the blowing agent wherein:

1=Water pipe; 2=Pre-expansion vessel; 3=Pre-expansion vessel outlet and rotary valve; 4=Pneumatic conveying line; 5=Exhaust pipe; 6=Storage bin; 7=Pneumatic conveying line; 8=Molding machine; 9=Aging Room; 10=Steam generator, 11=Scrubber; 12=Heat exchanger; 13=Condensing tank; 14=Cooling tower; 15=Air duct; 16=Air duct; 17=Steam pipe; 18=Water Pipe; 19=Ventilation inlet; 20=Storage bin outlets; 21=Steam generator burner inlet; 22=Filling Fan; 23=Air duct; 24=Steam duct; 25=Molding machine ventilation outlet; 26=Exhaust steam pipe; 27=Air duct; 28=Exhaust steam pipe; 29=Air duct; 30=Blower; 31=Air cooler; 32=Scrubber outlet; 33=Cooling fan: 34=Pump; 35=Water pipe; 36=Pump; 37=Water pipe; 38=Fan.

DETAILED DESCRIPTION OF THE INVENTION

Raw material comprising expandable polystyrene beads containing a blowing agent, normally n-pentane, is fed batchwise into the pressure pre-expander (2). Any pre-expander known in the art could be used in the process, as long as it permits recovery of the blowing agent and prevents even partial release of the blowing agent into the surrounding atmosphere. The pre-expander must be substantially hermetically sealed. As examples of pre-expanders which may be used in the instant process, there are (1) pressurized pre-expanders, such as AMD, manufactured by AMD di Dellai e Miramondi s.n.c., Presezzo (Bergamo), Italy; (2) a continuous pre-expander, operating at atmospheric pressure (e.g., manufactured by AMD di Dellai e Miramondi s.n.c., Presezzo (Bergamo), Italy); and, (3) a pre-expander which operates at negative pressure, such as the pre-expander described in U.S. Pat. No. 4,272,469. The pressurized pre-expander is preferred because it is commercially available, hermetically sealed, and permits a total recovery of pentane released during pre-expansion of the beads.

The raw beads may contain other blowing agents, e.g., iso-pentane, butane, hexane and mixtures thereof. N-pentane is preferred, and the process will hereinafter be described with reference to pentane as the blowing agent.

When the pressurized pre-expander mentioned above is used as the pre-expander (2), such is a completely closed cylindrical vessel which is designed to be operated at a pressure of approximately 6-15 lbs per square inch (psi) and a temperature of about 212°-230° F. In the most preferred embodiment, the vessel operates at 10 psi and at 220° F. A predetermined amount of saturated steam produced by the steam generator (10) (approximately 0.1 to 0.4 lbs. of steam per lb. of raw bead) is then introduced into the pressure pre-expander (2) through a pipe (17) for each batch of the raw material. The beads are then allowed to expand to a desired volume in the pressure pre-expander for approximately 1-10 minutes. It would be apparent to one skilled in the art that the degree of softening of the bead and the period of preheating are dependent on the density of the pre-expanded bead and the finished product desired. One skilled in the art may readily determine the appropriate combination of temperature and time for the pre-heat step. by considering the type of thermoplastic bead, the weight of the charge, the equipment and the desired density.

Once the beads have been expanded to their desired volume, they are removed therefrom through an outlet (3) located at the lower part of the pressure pre-expander (in a continuous-type pre-expander, the outlet would be located at the upper part) into a pneumatic conveying line (4) having an air stream of approximately 35 to 65 ft/sec., preferably about 50 ft./sec., which is used to transport the expanded beads through the line (4) into a closed storage bin (6). The residual mixture of vaporized pentane released from the beads during pre-expansion, steam and air is vented through the upper dome (or, in the continuous-type pre-expander, an upper outlet) of the pre-expansion vessel into an upper exhaust pipe (5) which carries the mixture to a steam condensing system comprising a scrubber (11) and a condensing tank (13). Air transported through a duct system (15) from the top of the storage bin (6) is introduced into the pneumatic line used to transport the beads from the outlet of the pressure pre-expander to the storage bin.

Having been introduced into the storage bin, the pre-expanded polystyrene beads remain up to several hours. The storage bin is completely closed and operates at atmospheric pressure. If desired, more than one storage bin may be used. The purpose of this storage period is to allow an equilibrium of pressure between the low pressure in the cellular structure of the recently pre-expanded beads and the higher outside atmospheric pressure to be established. During this storage period, the pre-expanded beads, in addition to absorbing air, at the same time, release a certain amount of their remaining pentane content.

Ventilation of the storage bin is provided by air transported through the duct system (16) from the aging room. The ventilating air is introduced to the lower part of the storage bin through an air inlet (19). Further, at the top of the storage bin are air outlets (20) which allow all of the air/pentane mixture generated from the release of pentane from the pre-expanded beads and the ventilating air to flow into a pipe (15) that leads directly into the air inlet (21) of the burner of the steam generator (10). By way of example, steam generators manufactured by Cleaver Brooks, a Division of Aqua-Chem, Inc., Milwaukee, Wisc., may be used in this process. Thus, the pentane from the storage bin is effectively recovered and used to partly fuel the steam generator.

After remaining in the storage bin for the desired period of time to allow pressure equilibrium to be established, pre-expanded beads are conveyed to the molding equipment, i.e., a closed mold (8) (suitable molds for this process are manufactured by NUOVA IDRO Press, Ciano D'Enza, Reggio Emilia, Italy), by means of a pneumatic conveying line (7) which transports the beads into the mold cavity. The pneumatic conveying line may be powered, for example, by an air blower (filling fan (22)) alone, or an air blower/standby silo/filling device system may be employed. The pneumatic transport system operates intermittently whenever the mold is to be filled with the pre-expanded beads for the molding cycle. The air used in this pneumatic transport system is then recirculated through a system comprising a duct (23) which leads back into the original pneumatic conveying line (7) which transports the beads from the storage bins to the molding equipment. Thus, this closed circuit air recirculation system avoids any pentane release into the surrounding atmosphere.

Once the beads have been introduced into the mold cavity, the molding process of the pre-expanded polystyrene foam articles is ready to take place. The molding cavity containing the pre-expanded beads is usually surrounded on all sides with steam chests, and the sides of the steam chests which are in contact with the mold cavity are usually perforated in order to allow the steam to enter the cavity. However, in some mold cavities, the sides of the steam chests are not perforated, but rather, steam is introduced into the cavity containing the beads through one direct line at the filling entrance as shown in U.S. Pat. No. 3,268,635. The outer sides of these steam chests are hermetically sealed. Saturated steam is provided for the steam chests by the steam generator through a pipe (24).

Thus, saturated steam enters the mold cavity containing the pre-expanded beads through the perforations (or the direct line at the filling entrance as in U.S. Pat. No. 3,268,635). During the molding cycle, the heat given off by the steam causes the beads to expand further but, since the beads are confined to the space of the mold cavity, the beads can only expand a limited amount and fusion of the beads with each other thereby occurs. The result of this molding cycle is a molded piece of foam which has the same configuration as the mold cavity. Pentane is also released from the beads during this molding cycle. After the steam phase of the molding cycle, the mold is cooled by (a) spraying cold water into the mold, which is recovered and sent back to the condensing tank through a pipe (18) and /or (b) an air stream which is recirculated through a water-cooled heat exchanger or air cooler (31). A cooling fan (33) aids in circulation of this air stream.

The steam entering the molding cavity becomes mixed with the released pentane and is vented through an outlet (25) into an exhaust pipe (26) and subsequently enters the condensing system along with the steam/pentane/air mixture which had been previously vented from the preexpander.

The air/stream/pentane mixture from both the preexpander and the mold enter the condensing system comprising a scrubber (11) and a vessel used for condensation (hereinafter "condensing tank") (13). It should be noted, however, that the condensing system may also comprise either a scrubber or a condensing tank alone in other embodiments of the process, as well as other means capable of performing the required condensation function. However, the process is described hereinafter with reference to the specific embodiment employing both a scrubber and a condensing tank.

The mixture first enters the scrubber (11) (through exhaust pipes (5) and (26), respectively), which is a vertical, cylindrical vessel with tangential entrances at the bottom to allow the air/stream/pentane inside the vessel. The scrubber contains a manifold along its vertical axis with several water-spraying nozzles and an outlet at the top (32) for gases which have not undergone condensation. A substantial amount of steam, up to approximately 50% of the amount having entered, condenses in the scrubber, and the condensed steam and spray water from the nozzles is expelled through a drain located at the bottom of the scrubber. This drained-off water is fed into the condensing tank through a pipe (1).

The remaining gaseous mixture of air/steam/pentane is vented through the scrubber outlet (32) and travels through exhaust pipe (28) to the condensing tank.

The condensing tank is a cylindrical and horizontal steel tank which operates at atmospheric pressure, and is approximately half-filled with water which is kept at a temperature between approximately 104° and 140° F. The pipe (28) carrying the air/steam/pentane mixture from the scrubber (11) enters the condensing tank and then branches into many smaller pipes. Each of these smaller pipe branches have many small vents or perforations. Further, these pipe branches are submerged into the water contained in the lower half of the cylindrical condensing tank. Thus, the incoming air/steam/pentane mixture is introduced directly into the water which causes the steam to condense. Since pentane gas does not condense at the temperature range of the water in the condensing tank and, further, is insoluble in water, it remains in the gaseous phase while all the steam is condensed to a liquid form. The pentane is removed by an air stream drawn from the storage bin through a duct (15) by a fan (38) travelling through the condenser and, thus, once separated from the steam, the pentane/air mixture is transported into a pipe (29) which merges with the pipe (15) carrying the air and pentane mixture from the storage bin. The mixture is introduced into the inlet (21) of the burner of the steam generator (10), along with natural gas from an outside source, and thus the pentane may serve to partly fuel the steam generator used in the process.

In order to offset the rise in temperature due to steam condensation, the water in the condensing tank should be cooled, for example, by means of a cooling system employing a cooling tower (14). Suitable cooling towers for use in this process are manufactured by The Marley Cooling Tower Co., P.O. Box 2912, Mission, Kans. The heated water from the condensing tank enters a pump (34) which pumps the water through a pipe (35) to the cooling tower (14). The water undergoes cooling therein (part of this water is evaporated in the cooling tower) and is expelled through an outlet at the lower part of the cooling tower, enters a second pump (36) which pumps the cooled water through a pipe (37) which branches and thus distributes the cooled water to either the scrubber (11) or the heat exchanger/air cooler (31). Water loss due to evaporation in the cooling tower will be set off by the steam condensed in the condensing tank.

After the mold cavity is cooled, the expanded polystyrene foam articles are removed therefrom and transported to the aging room (9). The aging room is a completely closed space in which all molded foam articles are stored for a period of approximately 24–96 hours, depending on the density of the finished foam article and its remaining pentane content. The aging room is kept at a temperature of approximately 100°–140° F., preferably about 120° F. Fresh air is drawn into a heat exchanger (12) in order to elevate the temperature thereof and then enters the aging room through a duct (27) at the opposite end of the aging room from the exhaust air duct (16). The molded foam articles stored therein release their remaining pentane content during this period. Since the room is intensely ventilated by means of a blower (30) which extracts air from the room, thereby creating a negative pressure inside, no pentane is able to leak from the room into the outside surrounding atmosphere. All the air which is extracted from the aging room is vented into an exhaust air duct (16), and is then powered by a blower (30) which creates the air flow necessary for the above-described ventilation for the storage bin.

Thus, it can be seen that by recovering the pentane during each stage of the above-described process, substantially all of the blowing agent contained in the original raw expandable polystyrene beads can be recovered and used to partly fuel the steam generator used in the process. Therefore, air pollution due to the escape of pentane or other gaseous blowing agents into the surrounding atmosphere is eliminated and greater energy cost savings can be attained by using the process of the present invention for the production of expanded polystyrene foam.

Having described the process in detail, it will be apparent to those skilled in the art that various modifications may be made thereto without departing from the spirit and scope of the invention as defined in the claims below.

What is claimed is:

1. A closed circuit process for the production of expanded polystyrene foam comprising the steps of:
   (a) pre-expanding raw polystyrene beads containing a blowing agent in a closed pre-expansion vessel;
   (b) storing said beads in one or more closed storage bins;
   (c) molding said expanded beads to a desired configuration in a closed mold with steam; and
   (d) removing the thus-formed article from the mold and placing such in an aging room,
wherein during each of said steps the blowing agent released from the beads is recovered, avoiding release of the blowing agent into the surrounding atmosphere, and
   (e) separating the recovered blowing agent from any residual steam by means of a condensing system.

2. The closed circuit process as claimed in claim 1, wherein said blowing agent is selected from the group consisting of n-pentane, iso-pentane, butane, hexane and mixtures thereof.

3. The closed circuit process as claimed in claim 2, wherein said blowing agent is n-pentane.

4. The closed circuit process as claimed in claim 1, wherein steam produced by a steam generator is introduced into said pre-expansion vessel.

5. The closed circuit process as claimed in claim 1, wherein said pre-expansion vessel is a pressurized pre-expansion vessel which operates at a pressure of from about 6 psi to about 15 psi and a temperature of about 212° F. to about 230° F.

6. The closed circuit process as claimed in claim 1, wherein a residual mixture of steam, air and blowing agent released during pre-expansion is transported from said pre-expansion vessel in an exhaust pipe through a condensing system wherein the blowing agent is separated from steam and recovered.

7. The closed circuit process as claimed in claim 6, wherein said condensing system comprises a scrubber and/or a condensing tank.

8. The closed circuit process as claimed in claim 1, wherein a residual mixture of steam, air and blowing agent released during molding is transported from said mold in an exhaust pipe through a condensing system wherein the blowing agent is separated from steam and recovered.

9. The closed circuit process as claimed in claim 8, wherein said condensing system comprises a scrubber and/or a condensing tank.

10. The closed circuit process as claimed in claim 1, wherein said closed storage bins operate at approximately atmospheric pressure.

11. The closed circuit process as claimed in claim 1, wherein the mixture of air and blowing agent released from the beads during storage is vented from said closed storage bins through an outlet and is transported through a duct to an inlet of the burner of a steam generator or an afterburner.

12. The closed circuit process as claimed in claim 1, wherein said pre-expanded beads are transported from said pre-expander vessel to said closed storage bins and from the closed storage bins to the mold by means of closed pneumatic conveying systems.

13. The closed circuit process as claimed in claim 12, wherein the air used to transport the pre-expanded beads in said pneumatic conveying systems is recirculated within a closed duct system avoiding any release of the blowing agent into the surrounding atmosphere.

14. The closed circuit process as claimed in claim 7, wherein the condensing tank is approximately half-filled with water which is kept at a temperature between about 104°–140° F.

15. The closed circuit process as claimed in claim 9, wherein the condensing tank is approximately half-filled with water which is kept at a temperature between about 104°–140° F.

16. The closed circuit process as claimed in claim 1, wherein the aging room operates at negative pressure and a temperature between about 100° F. and about 140° F.

17. The closed circuit process as claimed in claim 1, wherein the closed mold operates without releasing air, steam, pentane or mixtures thereof into the surrounding atmosphere.

18. The closed circuit process as claimed in claim 6, wherein the blowing agent recovered is transported through a duct to an inlet of the burner of a steam generator or an afterburner.

19. The closed circuit process as claimed in claim 8, wherein the blowing agent recovered is transported through a duct to an inlet of the burner of a steam generator or an afterburner.

20. The closed circuit process as claimed in claim 1, wherein said aging room enhances the release of the remaining blowing agent content of the molded articles stored therein, and also avoids release of said blowing agent into the surrounding atmosphere.

21. In a process for the production of expanded polystyrene foam comprising the steps of:
  (a) pre-expanding raw polystyrene beads containing a blowing agent in a closed pre-expansion vessel;
  (b) storing said beads in one or more closed storage bins;
  (c) molding said expanded beads to a desired configuration in a closed mold with steam; and
  (d) removing the thus-formed article from the mold and placing such in an aging room,
the improvement which comprises performing said process in a closed system by recovering said blowing agent during each of said steps, avoiding release of said blowing agent into the surrounding atmosphere, and separating the recovered blowing agent from any residual steam by means of a condensing system.

* * * * *